US009665336B2

United States Patent
Karunakaran et al.

(10) Patent No.: US 9,665,336 B2
(45) Date of Patent: May 30, 2017

(54) DIRECT STREAMING FOR WIRELESS DISPLAY

(71) Applicant: QUALCOMM Incorporated, San Diego, CA (US)

(72) Inventors: Sanal Kumar Karunakaran, San Diego, CA (US); Sanjay Kumar Agrawal, San Diego, CA (US); Sateesh Naidu Gorrepati, San Diego, CA (US); Devraj Gajraj Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 14/578,964

(22) Filed: Dec. 22, 2014

(65) Prior Publication Data

US 2016/0034245 A1 Feb. 4, 2016

Related U.S. Application Data

(60) Provisional application No. 62/030,410, filed on Jul. 29, 2014.

(51) Int. Cl.
*H04J 3/06* (2006.01)
*H04N 7/173* (2011.01)
*G06F 3/14* (2006.01)
*H04L 29/06* (2006.01)
*H04N 21/4363* (2011.01)

(52) U.S. Cl.
CPC .......... *G06F 3/1454* (2013.01); *G06F 3/1407* (2013.01); *G06F 3/1423* (2013.01); *H04L 65/602* (2013.01); *H04N 21/43637* (2013.01)

(58) Field of Classification Search
CPC ..... G06F 3/1454; G06F 3/1407; G06F 3/1423
USPC ............................................ 730/350; 725/90
See application file for complete search history.

(56) References Cited

U.S. PATENT DOCUMENTS

| | | | |
|---|---|---|---|
| 2004/0054689 A1 | 3/2004 | Salmonsen et al. | |
| 2008/0291891 A1 | 11/2008 | Jerlhagen et al. | |
| 2011/0283014 A1 | 11/2011 | Malik et al. | |
| 2013/0033496 A1 | 2/2013 | Raveendran et al. | |
| 2013/0201226 A1* | 8/2013 | Wu | G09G 5/10 345/690 |

(Continued)

FOREIGN PATENT DOCUMENTS

EP 2632168 A1 8/2013

OTHER PUBLICATIONS

Second Written Opinion from International Application No. PCT/US2015/042499, dated Jul. 4, 2016, 6 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

(Continued)

*Primary Examiner* — Pankaj Kumar
*Assistant Examiner* — Franklin Andramuno
(74) *Attorney, Agent, or Firm* — Shumaker & Sieffert, P.A.

(57) ABSTRACT

A source device comprises a memory to store video data and one or more processors, wherein the one or more processors are configured to obtain encoded video data for a frame of video data; output, via a display interface for the source device and for display at a display device, a predefined frame for the frame of video data; and send, to a sink device via a wireless communication channel, the encoded video data for display at a display device associated with the sink device.

26 Claims, 6 Drawing Sheets

(56) References Cited

U.S. PATENT DOCUMENTS

| | | | |
|---|---|---|---|
| 2013/0201915 A1* | 8/2013 | Wang | H04W 24/10 370/328 |
| 2013/0222210 A1 | 8/2013 | Wang et al. | |
| 2013/0238702 A1 | 9/2013 | Sheth et al. | |
| 2014/0112636 A1 | 4/2014 | Huang et al. | |
| 2014/0244856 A1 | 8/2014 | Kambhatla | |
| 2015/0030084 A1* | 1/2015 | Marchya | H04N 17/004 375/240.26 |
| 2015/0071281 A1* | 3/2015 | Shiotani | H04L 47/28 370/350 |
| 2015/0208079 A1* | 7/2015 | Pore | H04N 19/50 375/240.13 |
| 2015/0304684 A1* | 10/2015 | Donley | H04L 1/00 714/776 |
| 2015/0378665 A1* | 12/2015 | Han | G06F 3/1462 345/2.2 |

OTHER PUBLICATIONS

"Wi-Fi Display Technical Specification," Wi-Fi Alliance, Draft Version 1.7, 2012, accessed on Jul. 1, 2014, 176 pp.
"Real Time Streaming Protocol," Wikipedia, Last modified on Apr. 2015, 7 pp.
"Miracast," Wikipedia, Last modified on Jul. 2015, 4 pp.
International Search Report and Written Opinion from International Application No. PCT/US2015/042499, dated Nov. 9, 2015, 10 pp.
Response to Written Opinion dated Nov. 9, 2015, from International Application No. PCT/US2015/042499, filed on Feb. 8, 2016, 4 pp.
International Preliminary Report on Patentability issued by the EP International Preliminary Examining Authority in International application No. PCT/US2015/042499 on Oct. 14, 2016, 8 pp.
Response to Second Written Opinion dated Jul. 4, 2016, from International Application No. PCT/US2015/042499, filed on Aug. 31, 2016, 22 pp.

* cited by examiner

DIRECT STREAMING FOR WIRELESS DISPLAY

PRIORITY CLAIM

This application claims the benefit of U.S. Provisional Application No. 62/030,410, filed Jul. 29, 2014, the entire content of which is incorporated herein by reference.

TECHNICAL FIELD

The disclosure relates to transport and playback of media data and, more particularly, to directly streaming media content using wireless display.

BACKGROUND

Wi-Fi Display (also known as Miracast™) is a standard for wireless displays being developed by the Wi-Fi Alliance. The standard is based on Wi-Fi Direct. The Wi-Fi Display (WFD) standard provides an interoperable mechanism to discover, pair, connect, and render multimedia content sourced from a Wi-Fi Display Source at a Wi-Fi Display Sink. Additional information regarding the current WFD standard may be found in the Wi-Fi Display Technical Specification v1.0.0, and Wi-Fi Alliance, "Wi-Fi Display Specification draft version 1.31," Wi-Fi Alliance Technical Committee, Display Task Group, which is hereby incorporated by reference in its entirety.

Wireless display (WD) systems include a wireless display source device ("wireless source device" or simply "source device" herein) and one or more wireless display sink devices ("wireless sink devices" or simply "sink devices" herein). A source device may be a device that is capable of transmitting media content within a wireless local area network. A sink device may be a device that is capable of receiving and rendering media content. The source device and the sink devices may be either mobile devices or wired devices. As mobile devices, for example, the source device and the sink devices may comprise mobile telephones, portable computers with wireless communication cards, personal digital assistants (PDAs), portable media players, digital image capturing devices, such as a camera or camcorder, or other Flash memory devices with wireless communication capabilities, including so-called "smart" phones and "smart" pads or tablets, or other types of wireless communication devices. As wired devices, for example, the source device and the sink devices may comprise televisions, desktop computers, monitors, projectors, printers, audio amplifiers, set top boxes, gaming consoles, routers, vehicle dashboard displays, and digital video disc (DVD) players, and media servers.

A source device may send media data, such as audio video (AV) data, to one or more of the sink devices participating in a particular media share session. The media data may be played back at both a local display of the source device and at each of the displays of the sink devices. More specifically, each of the participating sink devices renders the received media data for presentation on its screen and audio equipment. In some cases, a user of a sink device may apply user inputs to the sink device, such as touch inputs and remote control inputs.

SUMMARY

In general, this disclosure relates to techniques for directly streaming media data from a wireless display source device to a wireless display sink device. In some examples, the techniques include directly transmitting coded input video data to the wireless display sink device, that is, without the wireless display source device decoding the coded input video data for output to a display device of the wireless display source device. Rather, the wireless display source device may output a predefined frame to the display device of the wireless display source device while transmitting the coded input video data to the wireless display sink device. As a result, other components of the wireless display source device, such as media applications and players, may operate normally to render and display the predefined frame to the display device. In addition, because coded input video data is transmitted to the wireless display sink device without having been decoded and displayed on display device (and without being subsequently encoded), the wireless display source device may avoid using video decoding and encoding hardware for direct streaming, which may provide a power savings for the wireless display source device. In addition, video quality may be improved at the sink device by avoiding the need to decode and then re-encode the data by the source side for mirroring on the sink device. In particular, by avoiding the re-encoding process and sending the original un-encoded data from the source device to the sink device, the video quality may be improved on the sink device.

To synchronize the audio data and video data of input media data for presentation at the wireless display sink device, for a given coded input frame of the video data, the wireless display source device determines a rendering time for the predefined frame output to the display device for the coded input frame. The rendering time may be determined by capturing the time when the predefined frame is consumed for rendering after audio-video synchronization is performed by the modules of the wireless display source device receiving the predefined frame. For instance, time of presentation may be determined as a time the buffer storing the predetermined frame is returned after consumption. This rendering time represents a presentation time for the coded input frame, and the wireless display source device associates this presentation time with the coded input frame in the transport stream sent to the wireless display sink device. Upon receiving the coded input frame in association with the presentation time via the transport stream, the wireless display sink device decodes the coded input frame and displays the input frame according to the presentation time. The wireless display source device captures, for coding and transport, decoded and output audio frames of the input media as the decoded audio frames are being presented or output by the wireless display source device. The respective presentation times for the audio data (decoded) and the predefined frame for the corresponding coded input frame are in this way synchronized for corresponding audio/video data. By obtaining and associating the presentation time for the predefined frame in the transport stream, the wireless display source device may in this way facilitate audio/video synchronization ("AV Sync") at the wireless display sink device. In addition, the techniques may enable a wireless display source device with limited encode and decode capability to transmit a video of higher resolution and quality for processing and output by a more capable wireless display sink device.

In one example, a method of transmitting video data from a wireless display source device to a wireless display sink device, the method comprising obtaining encoded video data for a frame of video data; outputting a predefined frame for the frame of video data; and sending the encoded video data for display at a display device associated with the wireless display sink device.

In one example, a source device comprises means for obtaining encoded video data for a frame of video data; means for outputting a predefined frame for the frame of video data; and means for sending, to a sink device via a wireless communication channel, the encoded video data for display at a display device associated with the sink device.

In one example, a source device comprises a memory to store video data; and one or more processors, wherein the one or more processors are configured to obtain encoded video data for a frame of video data; output, via a display interface of the source device and for display at a display device, a predefined frame for the frame of video data; and send, to a sink device via a wireless communication channel, the encoded video data for display at a display device associated with the sink device.

In one example, a computer-readable storage medium comprises instructions stored thereon that, when executed, configure one or more processors to: obtain encoded video data for a frame of video data; output a predefined frame for the frame of video data; and send the encoded video data for display at a display device associated with a wireless display sink device.

The details of one or more examples of the disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
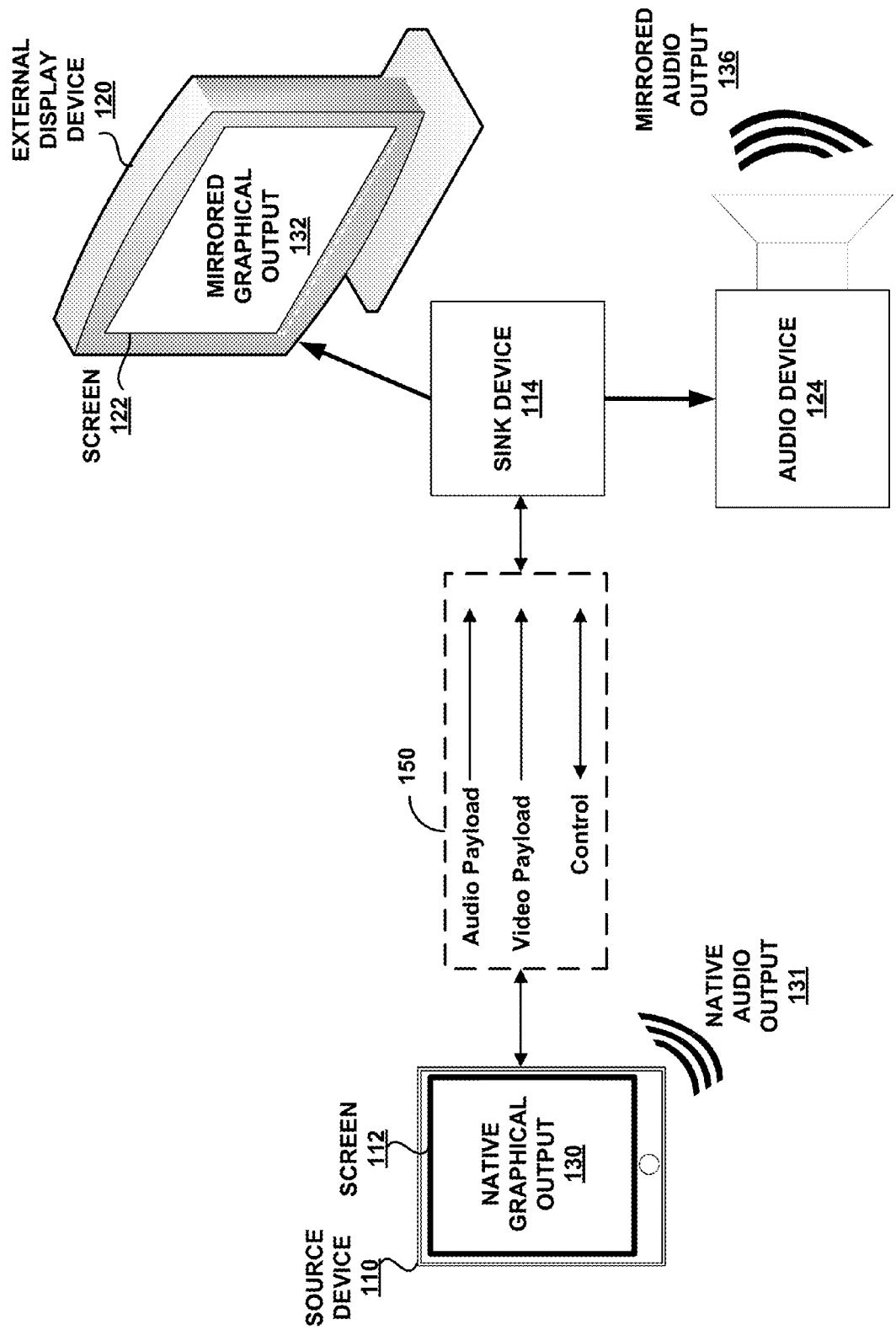
FIG. 1 is a block diagram that illustrates one example of a wireless display source computing device configured to directly stream encoded video data to a wireless display sink computing device according to techniques described in this disclosure.

A source device and a sink device may implement wireless display (WD) communication techniques that are compliant with standards such as, WirelessHD, Wireless Home Digital Interface (WHDI), WiGig, Wireless USB and the Wi-Fi Display (WFD) (also known as Miracast) standard. Additional information about the WFD standard may be found in Wi-Fi Alliance, "Wi-Fi Display Specification draft version 1.31," Wi-Fi Alliance Technical Committee, Display Task Group, which is hereby incorporated by reference in its entirety (hereinafter, "Wi-Fi Display specification"). A source device compatible with WFD, otherwise known as Miracast, may mirror audio and video output by the source device to a sink device for output by the sink device. In this way, for example, a smartphone user may mirror the video and audio output by the user's smartphone, tablet, or other computing device to another device, such as a television or projector, which may provide higher resolution display or an otherwise-improved user experience. According to the Wi-Fi Display specification, a WFD source device encodes video and audio data output to user interface devices of the WFD source device (e.g., a display and speakers) to generate encoded video and audio data. The WFD source device then packetizes and sends the encoded video and audio data to a WFD sink device for mirrored output by the WFD sink device. The WFD source device may consume often-scarce battery power to both decode and display the video data of the multimedia data.

The techniques of this disclosure may include directly streaming video data from a wireless display source device to a wireless display sink device. In some examples, the techniques include directly transmitting coded input video data (which may be, e.g., a movie read from a storage/memory device or received over a network) to the wireless display sink device, that is, without the wireless display source device decoding the coded input video data for output to a display device of the wireless display source device. Rather, the wireless display source device may output a predefined frame to the display device of the wireless display source device while transmitting the coded input video data directly to the wireless display sink device. As a result, other components of the wireless display source device, such as media applications and players, may operate normally to render and display the predefined frame to the display device. In addition, because coded input video data is output without having been decoded, the wireless display source device may avoid using video decoding hardware for direct streaming, which may provide a power savings for the wireless display source device. Because the coded data is directly streamed from the wireless display source device, further saving of power may be achieved, for capturing of frames rendered to display device and encoding the captured frame are avoided. Furthermore, the video quality may be improved at the sink device by avoiding the need to decode and then re-encoded the data by the source side for mirroring on the sink device. In particular, by avoiding the re-encoding process and sending the original un-encoded data from the source device to the sink device, the video quality may be improved on the sink device.

To synchronize the audio data and video data of input media data for presentation at the wireless display sink device, for a given coded input frame of the video data, the wireless display source device determines a rendering time for the predefined frame output to the display device for the coded input frame. The rendering time may be determined by capturing the time when the predefined frame is consumed for rendering after audio-video synchronization is performed by the modules of the wireless display source device receiving the predefined frame. For instance, time of presentation may be determined as a time the buffer storing the predetermined frame is returned after consumption. This rendering time represents a presentation time for the coded input frame, and the wireless display source device associates this presentation time with the coded input frame in the transport stream sent to the wireless display sink device.

Upon receiving the coded input frame in association with the presentation time via the transport stream, the wireless display sink device decodes the coded input frame and displays the input frame according to the presentation time. The wireless display source device captures, for coding and transport, decoded and output audio frames of the input media as the decoded audio frames are being presented/output by the wireless display source device. The respective presentation times for the audio data (decoded) and the predefined frame for the corresponding coded input frame are in this way synchronized for corresponding audio/video data. By obtaining and associating the presentation time for the predefined frame in the transport stream, the wireless display source device may in this way facilitate audio/video synchronization at the wireless display sink device.

FIG. 1 is a block diagram that illustrates one example of a wireless display source computing device 110 ("source device 110") configured to directly stream encoded video data to a wireless display sink computing device 114 ("sink device 114") according to techniques described in this disclosure. Source device 110 may comprise any device that includes at least one native output interface configured to output media, such as audio and/or visual media. For example, source device 110 depicted in FIG. 1 comprises a smart phone or tablet computer that includes a first output interface that comprises a display screen 112, and a second output interface that comprises one or more speakers (not depicted in FIG. 1) native to the source device. In other examples, source device 110 may comprise a laptop computer, desktop computer, gaming controller, or any other device that configured to use wireless display to directly stream encoded video data to a sink device 114.

As shown in the example of FIG. 1, screen 112 of source device 110 may be configured to output native graphical output 130. Native graphical output 130 may comprise, for example, one or more still or video images. As also shown in the example of FIG. 1, speakers of source device 110 are configured to provide native audio output 131. Native audio output 131 may comprise one or more audible sounds. Such audio output 131 may be associated with (e.g., configured to be output in conjunction with) graphical output 130. For example, where native graphical output 130 comprises video or image content, audio output 131 may comprise audible sounds associated with the video or image.

As shown in FIG. 1, source device 110 is communicatively coupled to at least one sink device(s) 114 (hereinafter "sink device 114"). Sink device 114 may be used by source device 110 to operate one or more output devices 120, 124 associated with the sink device 114, to mirror native media output of the source device 110. The term "mirror" as described herein may refer to controlling, by source device 110, at least one sink device 114 to output at least a portion of native media, such as native audio, video, and/or image media output of the source device 110.

Source device 110 may control sink device 114 with an active mirroring session to mirror media output of source device 110 via one or more output devices 120, 124 associated with sink device 114. For example, as shown in FIG. 1, source device 110 may control external display device 120 to output mirrored graphical output 132, which may comprise substantially similar graphical output to native graphical output 130 of source device 110. Mirrored graphical output 132 may comprise the same one or more images as native graphical output 130, but such images may be processed, sized, formatted, and/or otherwise modified for presentation via external display device 120.

As also shown in FIG. 1, source device 110 may control external audio device 124 to output mirrored audio output 136, which may comprise substantially similar audio output to audio output 131 depicted in FIG. 1. Mirrored audio output 136 may comprise the same audible sounds as native graphical output 130, but processed, formatted, and/or otherwise modified to be output via external audio device 124. In some examples, source device 110 may control sink device 114 to output media comprising native graphical output 130 as well as native audio output 131 of source device 110.

In some examples, such as shown in FIG. 1, sink device 114 may comprise a device that is coupled to one or more of an external display device 120, such as a television display, computer monitor, or the like, that includes a screen 122 configured to present images to a viewer, and/or an external audio device 124, such as speakers or a stereo system. For example, sink device 114 may comprise a set-top box (e.g., GOOGLE TV, APPLE TV, ROKU), gaming console (e.g., NINTENDO WII, SONY PLAYSTATION 3, MICROSOFT XBOX), digital video disc (DVD) player, smart TV, TV dongle device (e.g., Google Chromecast), Blu-ray player, or other separate unit coupled to an external display device and/or an external audio device as shown in the example of FIG. 1. In other examples not depicted in FIG. 1, one or more of sink device 114, external display device 120, and/or external audio device 124 may be combined as a single device. For example, a display device, such as a television or computer monitor, may include both a screen 122 and one or more speakers. In other examples, the same, or different, sink devices 114 may control one or more audio or video output interfaces that are separate from the one or more sink devices 114. According to still other examples, the functionality performed by sink device 114 as described herein may be performed by one or more of an external display device and/or an external audio device. For example, a television display and/or stereo receiver may include hardware and/or software configured to communicatively couple the television and/or stereo with source device 110, such that native media of source device 110 may be mirrored the television display or stereo receiver.

Source device 110 streams multimedia data to sink device 114 to mirror media output of source device 110 via wireless communication channel 150. Communication channel 150 may be a relatively short-range communication channel, and may implement a physical channel structure such as or similar to Wi-Fi, Bluetooth, or the like, such as implementing defined 2.4, GHz, 3.6 GHz, 5 GHz, 60 GHz or Ultra-wideband (UWB) frequency band structures. However, communication channel 150 is not necessarily limited in this respect, and may comprise any wireless or wired communication medium, such as a radio frequency (RF) spectrum or one or more physical transmission lines, or any combination of wireless and wired media. In other examples, communication channel 150 may even form part of a packet-based network, such as a wired or wireless local area network, a wide-area network, or a global network such as the Internet. Additionally or alternatively, communication channel 150 may be used by source device 110 and sink device 114 to create a peer-to-peer link.

Source device 110 and sink device 114 may establish a communication session according to a capability negotiation using, for example, Real-Time Streaming Protocol (RTSP) control messages. In one example, a request to establish a communication session may be sent by the source device 110 to the sink device 114. Once the media share session is established, source device 110 transmits media data, e.g., audio video (AV) data, to the sink device 114 using the Real-time Transport protocol (RTP). Sink device 114 renders and outputs the received media data to external display device 120 and audio device 124.

Source device 110 and sink device 114 may then communicate via communication channel 150 using a communications protocol such as a standard from the IEEE 802.11 family of standards. In one example communication channel 150 may be a network communication channel. In this example, a communication service provider may centrally operate and administer the network using a base station as a network hub. Source device 110 and sink device 114 may, for example, communicate according to the Wi-Fi Direct and/or Wi-Fi Display (WFD) standards, such that source device 110 and sink device 114 communicate directly with one another without the use of an intermediary such as wireless access points or so called hotspots. Source device 110 and sink device 114 may also establish a tunneled direct link setup (TDLS) to avoid or reduce network congestion. Wi-Fi Direct and TDLS are intended to setup relatively short-distance communication sessions. Relatively short distance in this context may refer to, for example, less than approximately 70 meters, although in a noisy or obstructed environment the distance between devices may be even shorter, such as less than approximately 35 meters, or less than approximately 20 meters.

The techniques of this disclosure may at times be described with respect to WFD, but it is contemplated that aspects of these techniques may also be compatible with other communication protocols. By way of example and not limitation, the wireless communication between source device 110 and sink device 114 may utilize orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA.

As described above, source device 110 may be configured to mirror media output of source device 110 via sink device 114. For example, source device 110 may provide a user with a user-selectable option to activate or deactivate a mirroring mode where native audio media, visual media, or both are output via sink device 114. In a standard operating mode, source device 110 may receive media in the form of a plurality of encoded media data via a communication medium (e.g., the Internet) or from a computer-readable storage medium such as hard drive or digital video disc (DVD), and control one or more native output interfaces of source device 110 to output media comprising the plurality of encoded media data. Such native output interfaces may include screen 112 for outputting native graphical output 130 and/or a speaker for outputting native audio 131. In such a mirroring mode, source device 110 may control sink device 114 to cause sink device 114 to output substantially the same media as native graphical output 130 and/or native audio output 131 that source device 110 would have output using one or more native output interfaces in the standard operating mode.

According to techniques described in this disclosure, when operating to mirror native graphical output 130 to sink device 114, source device 110 may pause mirroring of native graphical output 130 to send video data of received media data to sink device 114 via communication channel 150 without having decoded the video data and without interfering with existing video playback or streaming applications. In some examples, source device 110 does not output the video data for display as native graphical output 130.

In some examples, rather than decoding the encoded video data to obtain and output native graphical output 130 via screen 112, source device 110 may output a predefined video frame as native graphical output 130 for display at screen 112 while concurrently sending the encoded video data to sink device 114. For example, a user may request an application executed by source device 110 to play multimedia data. The application may obtain the multimedia data, encoded in accordance with a compression standard, via a communication channel to a server or from a computer-readable storage medium of the source device 110, for example. When operating in mirroring mode, in lieu of frames of decoded video data of the multimedia data, the source device 110 outputs a predefined video frame to screen 112 for display as native graphical output 130. Concurrently, source device 110 sends encoded video data of the encoded multimedia data to sink device 114.

In some examples, the source device 110 facilitates synchronized output of audio and video data of the multimedia data at sink device 114 by associating a presentation time with the video data sent via communication channel 150. The source device 110 may obtain the presentation time based on a presentation of a predefined video frame output by the source device 110 as native graphical output 130. In other words, when operating in mirroring mode, the source device 110 may, in lieu of a video frame of video data of the multimedia data, output a predefined frame to screen 112 as native graphical output 130. The source device 110 obtains a timestamp based on the presentation time for the predefined frame output corresponding to the video frame and sends the encoded video data for the video frame in association with the timestamp. The sink device 114 may then decode the encoded video data to obtain the video frame and output the video frame to external display device 120 as mirrored graphical output 132 at the time specified by the timestamp. In some examples, the source device 110 mirrors the audio data of multimedia data by encoding rendered audio data and associating the encoded audio data with presentation times of the corresponding audio data. By also obtaining and associating a presentation time for a predefined video frame in the transport stream in the manner described above, the source device 110 facilitates synchronized output of audio and video at sink device 114.

A predefined frame may in some examples be a black frame to minimize power consumption of screen 112 to present the black frame. In some examples, the predefined frame may be a logo, a user alert or other user message. The predefined frame may have a resolution similar to that of video frames for the encoded, input video data.

In some examples, the source device 110 uses a mirroring decoder for "decoding" video data while operating in mirroring mode. The mirroring decoder may present an interface identical to other video decoders for a decoder interface to decoding hardware of source device 110. The mirroring decoder may further provide a video frame buffer flow identical to that of other video decoders for the decoder interface. However, rather than decoding video data for output to screen 112, the mirroring decoder in such examples consumes input buffers for the decoder interface, the input buffers storing encoded video data, and source device 110 sends the encoded video data to sink device 114. In addition, rather than decoding the encoded video data for output via output buffers for the decoder interface, the mirroring decoder writes a predefined frame to the output buffers for the decoder interface. As a result, the source device 110 may output the predefined frame to screen 112 as native graphical output 130. A time an output buffer is consumed at least approximates a presentation time for the video frame stored to the output buffer. The mirroring decoder may receive a signal or other notification from a mirroring application that the output buffer is consumed, generate a timestamp upon signal receipt, and associate the timestamp with corresponding encoded video data that would have otherwise been decoded and stored to the output buffer. The source device 110 may then send the encoded video data in association with the timestamp (a presentation time) in a transport stream to sink device 114 to cause the sink device 114 to decode the encoded video to a video frame and present the video frame at the associated presentation time.

Figure 2:
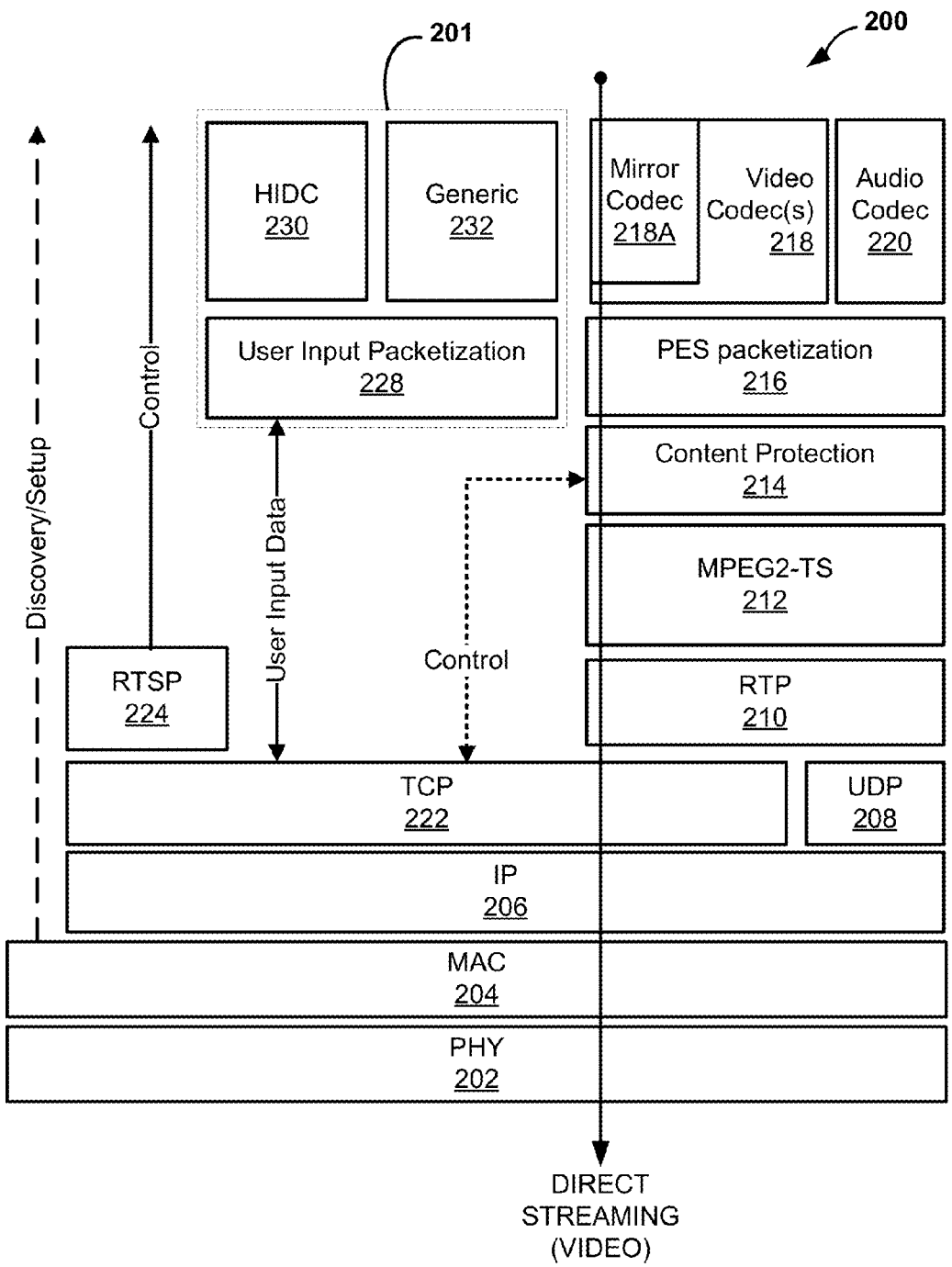
FIG. 2 is a block diagram illustrating an example of a data communication model or protocol stack for a wireless display system.

FIG. 2 is a block diagram illustrating an example of a data communication model or protocol stack for a wireless display (WD) system. Data communication model 200 illustrates the interactions between data and control protocols used for transmitting data between a source device and a sink device in an implemented WD system. In some examples, source device 110 of FIG. 1 may use data communication model 200. Data communication model 200 includes physical (PHY) layer 202, media access control (MAC) layer (204), internet protocol (IP) 206, User Datagram Protocol (UDP) 208, real-time transport protocol (RTP) 210, MPEG2 transport stream (MPEG2-TS) 212, content protection 214, packetized elementary stream (PES) packetization 216, video codec 218 including mirror codec 218A, audio codec 220, transport control protocol (TCP) 222, real time streaming protocol (RTSP) 224, user input packetization 228, human interface device commands (HIDC) 230, and generic user inputs 232. User input packetization 228, HIDC 230, and generic user inputs 232 may constitute the User Input Back Channel (UIBC) 201.

Physical layer 202 and MAC layer 204 may define physical signaling, addressing and channel access control used for communications in a WD system. Physical layer 202 and MAC layer 204 may define the frequency band structure used for communication, e.g., Federal Communications Commission bands defined at 2.4, GHz, 3.6 GHz, 5 GHz, 60 GHz or Ultrawideband (UWB) frequency band structures. Physical layer 202 and MAC 204 may also define data modulation techniques e.g. analog and digital amplitude modulation, frequency modulation, phase modulation techniques, and combinations thereof. Physical layer 202 and MAC 204 may also define multiplexing techniques, e.g. example, time division multi access (TDMA), frequency division multi access (FDMA), code division multi access (CDMA), or any combination of OFDM, FDMA, TDMA and/or CDMA. In one example, physical layer 202 and media access control layer 204 may be defined by a Wi-Fi (e.g., IEEE 802.11-2007 and 802.11n-2009x) standard, such as that provided by WFD. In other examples, physical layer 202 and media access control layer 204 may be defined by any of: WirelessHD, Wireless Home Digital Interface (WHDI), WiGig, and Wireless USB.

Internet protocol (IP) 206, User Datagram Protocol (UDP) 208, real-time transport protocol (RTP) 210, transport control protocol (TCP) 222, and real time streaming protocol (RTSP) 224 define packet structures and encapsulations used in a WD system and may be defined according to the standards maintained by the Internet Engineering Task Force (IETF).

RTSP 224 may be used by source device 110 and sink device 114, for instance, to negotiate capabilities, establish a session, and session maintenance and management. Source device 110 and sink device 114 may establish the feedback channel using an RTSP message transaction to negotiate a capability of source device 110 and sink device 114 to support the feedback channel and feedback input category on the UIBC. The use of RTSP negotiation to establish a feedback channel may be similar to using the RTSP negotiation process to establish a media share session and/or the UIBC.

One or more video codec(s) 218 may define the video data coding techniques that may be used by a WD system for compressing video data for transport via a WD communication channel. Each of the video codec(s) 218 may implement any number of video compression standards, such as ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), VP8, VP9 and High-Efficiency Video Coding (HEVC). It should be noted that in some instances WD system may either compressed or uncompressed video data. Video codec(s) 218 includes, in this example, a mirror codec 218A for directly streaming encoded video data to a WD sink device.

Audio codec 220 may define the audio data coding techniques that may be used by a WD system. Audio data may be coded using multi-channel formats such those developed by Dolby and Digital Theater Systems. Audio data may be coded using a compressed or uncompressed format. Examples of compressed audio formats include MPEG-1, 2 Audio Layers II and III, AC-3, AAC, and Vorbis. An example of an uncompressed audio format includes pulse-code modulation (PCM) audio format.

Packetized elementary stream (PES) packetization 216 and MPEG2 transport stream (MPEG2-TS) 212 may define how coded audio and video data is packetized and transmitted. Packetized elementary stream (PES) packetization 216 and MPEG-TS 212 may be defined according to MPEG-2 Part 1. In other examples, audio and video data may be packetized and transmitted according to other packetization and transport stream protocols. Content protection 214, may provide protection against unauthorized copying of audio or video data. In one example, content protection 214 may be defined according to High bandwidth Digital Content Protection 2.0 specification.

UIBC 201 includes user input packetization 228, which may define how user input is packetized. Human interface device commands (HIDC) 230, generic user inputs 232 may define how types of user inputs are formatted into information elements. For example, human interface device commands 230 and generic user inputs 232 may categorize inputs based on user interface type (e.g., mouse, keyboard, touch, multi-touch, voice, gesture, vendor-specific interface, etc.) and commands (e.g. zoom, pan, etc.) and determine how user inputs should be formatted into information elements. Categorization as either HIDC and generic user input typically affects how subsequent media data is presented to the user at sink device 114, (e.g., zoom and pan operations) and how source device 110 processes (e.g., encodes and/or transmits) the media data to sink device 114.

Mirror codec 218A may present an interface identical to other video codec(s) 218 for a decoder interface to decoding hardware of source device 110. The mirror codec 218A may further provide a video frame buffer flow identical to that of other video decoders for the decoder interface. However, rather than decoding video data received at the top of data communications model 200, mirror codec 218A consumes input buffers for the decoder interface, the input buffers storing encoded video data, and presents the encoded video data to PES packetization 216. In addition, mirror codec 218A writes a predefined frame to the output buffers for the decoder interface. As a result, a device operating according to data communications model 200 may output the predefined frame for display. A time an output buffer is consumed at least approximates a presentation time for the video frame stored to the output buffer by the mirror codec 218A. Mirror codec 218A may receive a signal or other notification (from a mirroring application that employs data communication model 200) that the output buffer is consumed. Mirror codec 218A may generate a timestamp upon signal receipt, and associate the timestamp with corresponding encoded video data that would have otherwise been decoded and stored to the output buffer. MPEG2-TS layer 212 and RTP 210 may receive this timestamp and associate the timestamp with the encoded video data as a presentation time for video data. For example, MPEG2-TS layer 212 may set the presentation timestamp (PTS) in the transport stream for the mirrored video data to the timestamp so as to synchronize the video data presentation to the audio data presentation.

A mirroring application of a wireless display source device may employ data communications model 200 to mirror audio and video data. Mirror codec 218A of video codec(s) 218 may enable the mirroring application to reduce power consumption at the wireless display source device with little or no impact to existing video playback or streaming applications. Because mirror codec 218A does not encode rendered video data according to conventional wireless display techniques, data communication model 200 uses a connection-oriented, guaranteed-delivery transport protocol (here, TCP 222) rather than UDP 208 to directly stream encoded video data to make up for the loss of the ability to identify and retransmit lost I-frames.

In some examples and in accordance with techniques described herein, during RTSP 224 session negotiation, a source device 110 that executes data communication model 200 may advertise using RTSP 224 all supported codecs and corresponding supported profiles and levels. The source device 110 may then begin mirroring using the best common supported codec with the best supported resolution and profile in both the source device 110 and sink device 114.

Upon playback of video data, source device 110 may load mirror codec 218A that determines, based on session video information, whether the format of the video data is supported by sink device 114. If the format is supported, mirror codec 218A may determine whether more than one video decoding session is active and, if so, use mirroring techniques described herein.

However, if the format is supported by the sink device 114 and only one video decoding session is active, source device 110 may sends a message to sink device 114 indicating the new video format to be used for streaming the video data. The source device 110 then sends video frames to the sink device 114. The sink device may send the video frames in association with timestamps obtained at times when the player is rendering a predefined frame to achieve synchronization with audio captured from output of audio mixer in the source device 110. Upon the conclusion of video data playback, source device 110 notifies sink device 114 of the video format to be used for mirroring, and the video decoding session may continue with mirroring.

Figure 3:
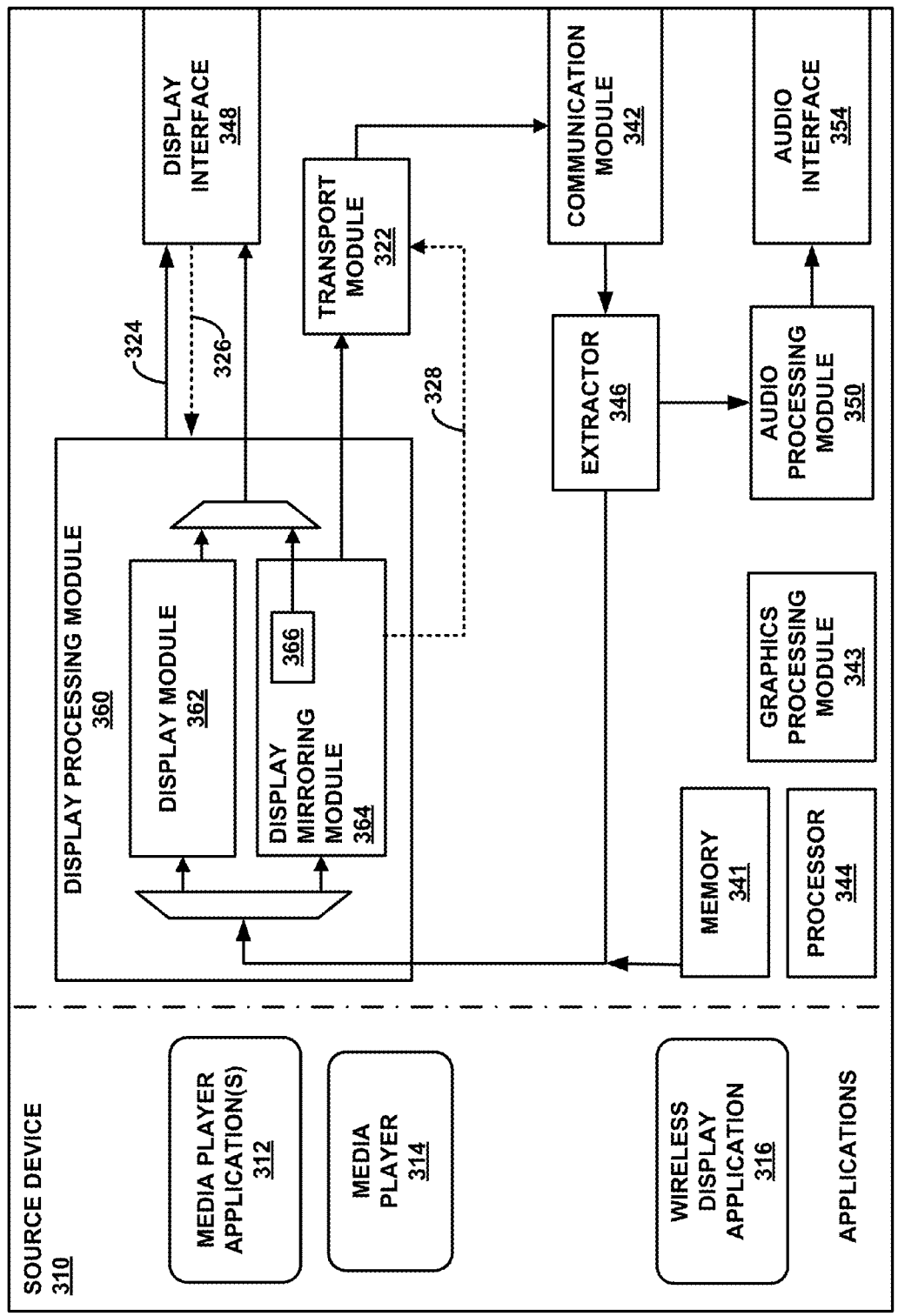
FIG. 3 is a block diagram illustrating an example of a wireless display source device according to techniques described in this disclosure.

FIG. 3 is a block diagram illustrating an example of a wireless display source device according to techniques described in this disclosure. As shown in FIG. 3, source device 310 includes a memory 341, a communications module 342, a graphics processing module 343, a processor 344, a display interface 348 and an audio interface 354.

Processor 344 may include one or more components of device 310 configured to execute instructions. For example, processor 344 may comprise one or more central processing units (CPU), application specific integrated circuits (ASICs), field programmable gate arrays (FPGAs), discrete logic components, or other component configured to execute instructions that control operation of device 310.

Memory 341 comprises one or more components of device 310 configured to store data and/or instructions, such as one or more magnetic storage components, optical storage components, random access memory (RAM) storage components, FLASH memory storage components, or any other component configured to store instructions and/or data. For example, memory 341 may store one or more software programs that operate device 310. Memory 341 may also or instead be configured to store data that represents media that may be output by device 310. For example, memory 341 may store one or more digital representations of audible sounds, still images, video, or other media that may be output by device 310.

Communications module 342 may comprise one or more hardware and/or software components of device 310 configured to enable device 310 to communicate with one or more other devices. For examples, communications module 342 may comprise one or more components that enable one or more of wireless communication (e.g., WI-FI, Bluetooth, cellular network (e.g., 3G, 4G cellular network) or wired communication (e.g., Ethernet). In some examples, communications module 342 may be used by device 310 to control another device to another device, such as sink device 114 depicted in FIG. 1, to mirror media output of device 310. For example, source device 310 may be coupled to the sink device via communications module 342 such that source device 310 may communicate data and/or instructions that cause the sink device to mirror data according to the techniques described herein.

Graphics processing module 343 may comprise one or more hardware and/or software components of device 310 configured to process graphics instructions (e.g., higher level graphics instructions such as, for example, one or more instructions according to the OpenGL standard) and generate image data that may be used to present images via display interface 348. For example, graphics processing module 343 may comprise a graphics processing unit (GPU) and/or other components configured to process graphics. In some examples, graphics module 343 may process graphics based on graphics instructions received from one or software applications executing on processor 344. In other examples, graphics module 343 may process graphics based on graphics instructions received from memory 341 and/or communications module 342.

As depicted in FIG. 3, device 310 may also include a display processing module 360 and an audio processing module 350. Audio processing module 350 may process received image data to control one or more speakers external to source device 310. For example, audio processing module 350 may, via audio interface 354, control at least one speaker. Audio processing module 350 may process audio data to be sent to one or more external audio interfaces to mirror native audio media output of source device 310. For example, audio processing module 350 may process the audio data by modifying a bit rate, volume, audio encoding technique, or other characteristic of audio data for output via one or more speakers.

Display processing module 360 may be configured to receive, from one or more sources such as memory 341, communications module 342, graphics processing module 343, and/or one or more software applications executing on processor 344, image data that represents one or more media elements that represent one or more images for display. Display processing module 360 may be configured to process such received data for presentation via one or more displays. For example, as depicted in FIG. 3, display processing module 360 may process image data to control a native display of source device 310, such as screen 112 that is a native display of source device 110 depicted in FIG. 1.

Display processing module 360 includes display module 362 and display mirroring module 364 to direct and/or process received image data to control one or more displays. For example, display module 362 may perform display processing functionality for a non-mirroring mode of source device 310, wherein display module 362 outputs video data, via display interface 348, to control at least one display associated with source device 310 (e.g., screen 112 communicatively coupled to source device 110 depicted in FIG. 1). Display processing module 360 may execute one or more video codecs to decode or directly stream encoded video frames received from media player 314. For example, display mirroring module 364 may execute an instance of mirror codec 218A of FIG. 2 to directly stream encoded video frames to a sink device and output a predefined frame 366 via display interface 348, while display module 362 may decode encoded video frames for display via display interface 348. Predefined frame 366 may be stored by memory 341.

Display mirroring module 364 may comprise any combination of hardware and/or software components that are configured to control whether and how one or more media elements received by display processing module 360 and/or audio processing module 350 are mirrored to a sink device consistent with one or more aspects of this disclosure. For example, in response to receiving a new media element from one or more sources (e.g., memory 341, communications module 342, graphics processing module 343, and/or one or more software applications executing on processor 344), display mirroring module 364 may send the new media element directly to a sink device. Display mirroring module 364 stores a predefined frame 366 for output via display interface 348. Predefined frame 366 may represent a YCbCr (or "YUV") frame for display via display interface 348. Predefined frame 366 may be a black frame to save power, e.g., when adaptive backlight is in use, or may display a logo, image, or other message to a display device when output via display interface 348.

Display mirroring module 364 may store predefined frame 366 to output buffers 324 for display via display interface 348. When an output buffer 324 is consumed, display processing module 360 may receive a signal or other indication 326 that the output buffer 324 is consumed. In response, display processing module 360 may associate a presentation time 328 with corresponding encoded video data for transport to a wireless display sink device to synchronize presentation of the video data with audio data. The presentation time 328 may correspond to a time at which output buffer 324 is rendered, output via display interface 348, and/or otherwise presented by media player 314.

In the example of FIG. 3, display processing module 360, audio processing module 350, and display mirroring module 364 are depicted as separate functional hardware and/or software components for purposes of describing the techniques of this disclosure. In other examples, functionality described herein with respect to display processing module 360, audio processing module 350, and/or display mirroring module 364 may be performed by a unitary hardware and/or software component. In other examples, any one of display processing module 360, audio processing module 350, and/or display mirroring module 364 may comprise multiple hardware and/or software components that, in combination, operate according to the functionality attributed to display processing module 360, audio processing module 350, and/or mirroring module 364 as described herein. In addition, even if one or more display processing module 360, audio processing module 350, and/or display mirroring module 364 described herein are implemented in software, such software modules as described herein may comprise hardware in that they functionally operate by executing on a hardware processing component.

Applications executed by source device 310, i.e., one or more media player application(s) 312, a media player 314, and wireless display application 316 (e.g., a Miracast application) may determine the operation of display processing module 360, audio processing module 350, and/or display mirroring module 364 during operation of source device 310. Applications may respond to user input to, e.g., configure and start a wireless display session with a sink device, playback video via the wireless display session, control the wireless display session, and so forth.

Figure 4:
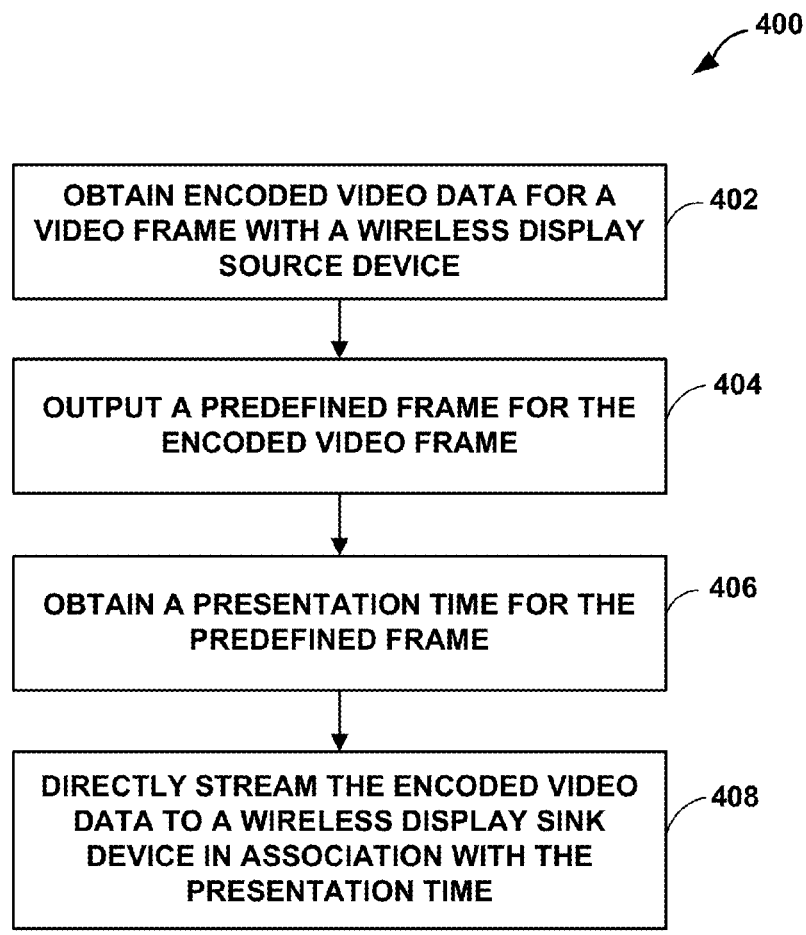
FIG. 4 is a flowchart illustrating an example mode of operation for a wireless display source device according to techniques described in this disclosure.

FIG. 4 is a flowchart illustrating an example mode of operation for a wireless display source device according to techniques described in this disclosure. Source device 110 obtains encoded video data for a video frame of multimedia data (402). Rather than decode and render the encoded video data as the video frame, source device 110 outputs a predefined video frame for the video frame (404). In addition, source device 110 obtains a presentation time at which the predefined video displays to a display associated with source device 110 (406). Source device associates the presentation time with the encoded video data for the video frame and directly streams the encoded video data and presentation time to a wireless display sink device to cause the wireless display sink device to present the video frame at the presentation time (408).

Figure 5:
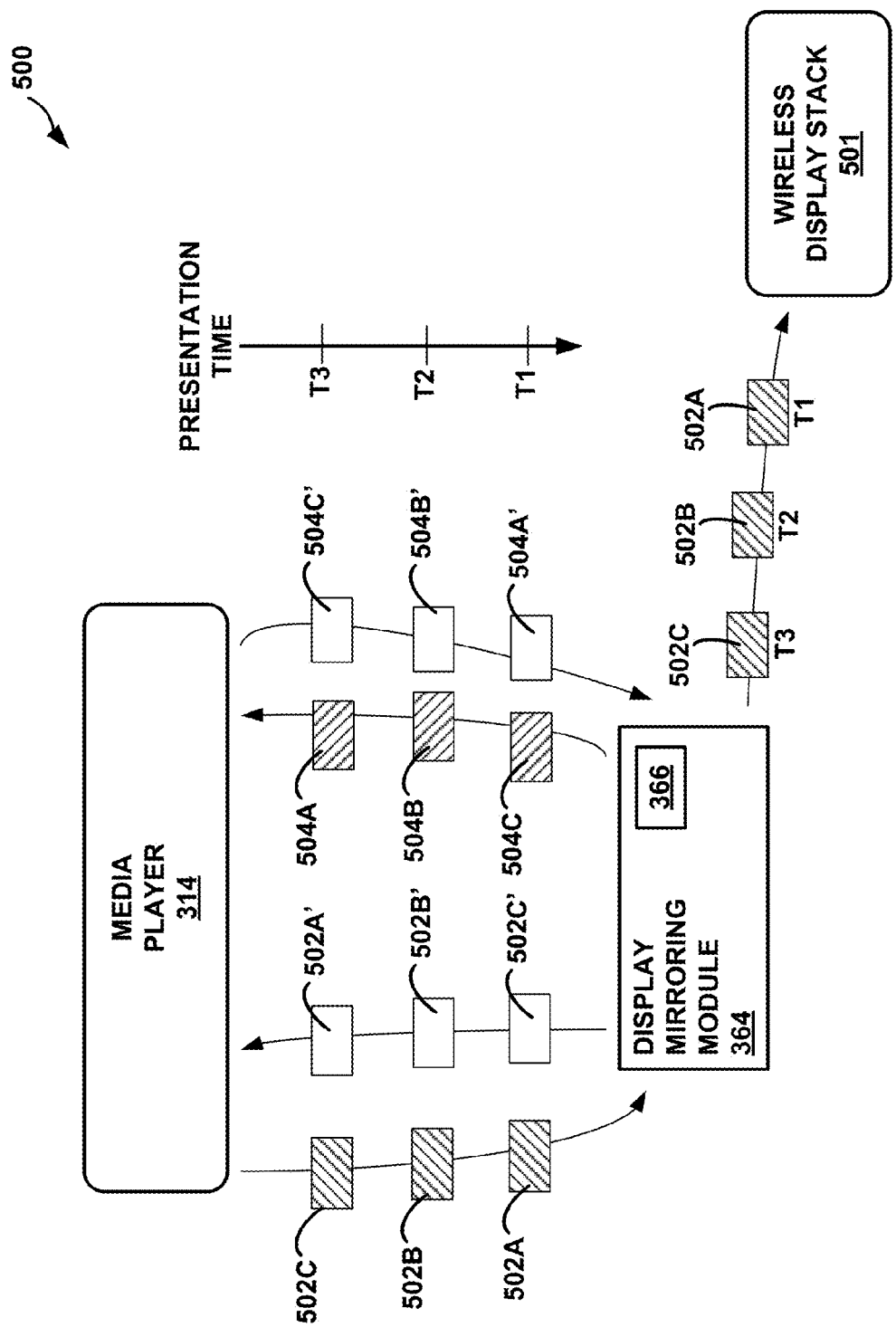
FIG. 5 is a block diagram illustrating an example data flow for determining video frame presentation times by a wireless display source for audio/video synchronization according to techniques described herein.

FIG. 5 is a block diagram illustrating an example data flow for determining video frame presentation times by a wireless display source for audio/video synchronization according to techniques described herein. In this example, media player 314 obtains and provides encoded video frames to display mirroring module 364 using buffers 502A-502C. As described above with respect to FIG. 3, display mirroring module 364 operates in part as offering a decoding interface to media player 314 and thus as a "decoding component," although display mirroring module 364 may not decode the encoded video frames. Rather, display mirroring module 364 consumes, e.g., reads, and returns the buffers 502A-502C to the media player 314 as buffers 502A'-502C' for subsequent use. Display mirroring module 364 may register an example of mirror codec 218A for use by media player 314 for "decoding" encoded video frames. Mirror codec 218A may have an interface invokable by media player 314 and identical or at least similar to the interface of video codecs that perform video decoding (i.e., "actual" video codecs that perform video decoding instead of, or in addition to, directly streaming encoded video frames to a sink device).

Instead of decoding the encoded video frames received in buffers 502A-502C, display mirroring module may pass the encoded video frames directly through to wireless display stack 501. Wireless display stack 501 may represent an example instance of a data communication model 200 of FIG. 2, excluding the codec layers 218, 220. Wireless display stack 501 may represent an example instance of a Miracast stack.

In lieu of decoded video frames for the encoded video frames, display mirroring module 364 returns copies of the predefined frame 366 to media player 314 using buffers 504A-504C. That is, each of buffers 504A-504C includes a copy of predefined frame 366 for consumption by media player 314, which may include rendering the copy of the predefined frame 366 for output via a display interface to a display (not shown in FIG. 5). Presentation times T1-T3 may thus refer to a time at which media player 314 consumes and releases respective buffers 504A-504C for re-use by the video pass-through decoder for display mirroring module 364. Buffers 502A-502C and 504A-504C may each represent a set of storage elements in one or more computer-readable storage media (not shown). Buffers 504A-504C may represent example instance of output buffers 324 of FIG. 3. Display mirroring module 364 may include, in conjunction with sending predefined frame 366 to the media player 314, any metadata and timing information to cause media player 314 to play the predefined frame as if it is the decoded video frame for a corresponding encoded video frame received in buffers 502.

At respective presentation times ("PRESENTATION TIME"), media player 314 consumes and returns buffers 504A-504C as buffers 504A'-504C'. In the illustrated example, media player 314 consumes buffer 504A at presentation time T1, consumes buffer 504B at presentation time T2, and consumes buffer 504C at presentation time T3. Display mirroring module 364, in response to receiving respective notifications from media player 314 of the consumption of buffers 504A-504C, associates the presentation times for the buffers with the outgoing encoded video frames in buffers 502A-502C, which the wireless display source device sends via wireless display stack 501. In the illustrated example, therefore, display mirroring module 364 associates the encoded video frame stored to buffer 502A with presentation time T1, associates the encoded video frame stored to buffer 502B with presentation time T2, and associates the encoded video frame stored to buffer 502A with presentation time T1.

As one example techniques to associate a presentation time with an encoded video frame directly streamed to a wireless display sink device using, e.g., Wi-Fi Display, display mirroring module 364 may cause the wireless display stack 501 to associate the presentation time with a network access layer (NAL) unit or packet. For example, wireless display stack 501 may set a presentation timestamp (PTS) of a packetized elementary stream (PES) header of a PES that transports the encoded video frame to the presentation time associated with the encoded video frame as determined by display mirroring module 364. The PES may be combined with other PESes generated by wireless display stack 501 in a similar manner, so as to form a transport stream (TS) or program stream (PS). In this way, a wireless display sink device may determine to remove the decoded video for the encoded video frame and presented at the presentation time associated with the encoded video frame.

Figure 6:
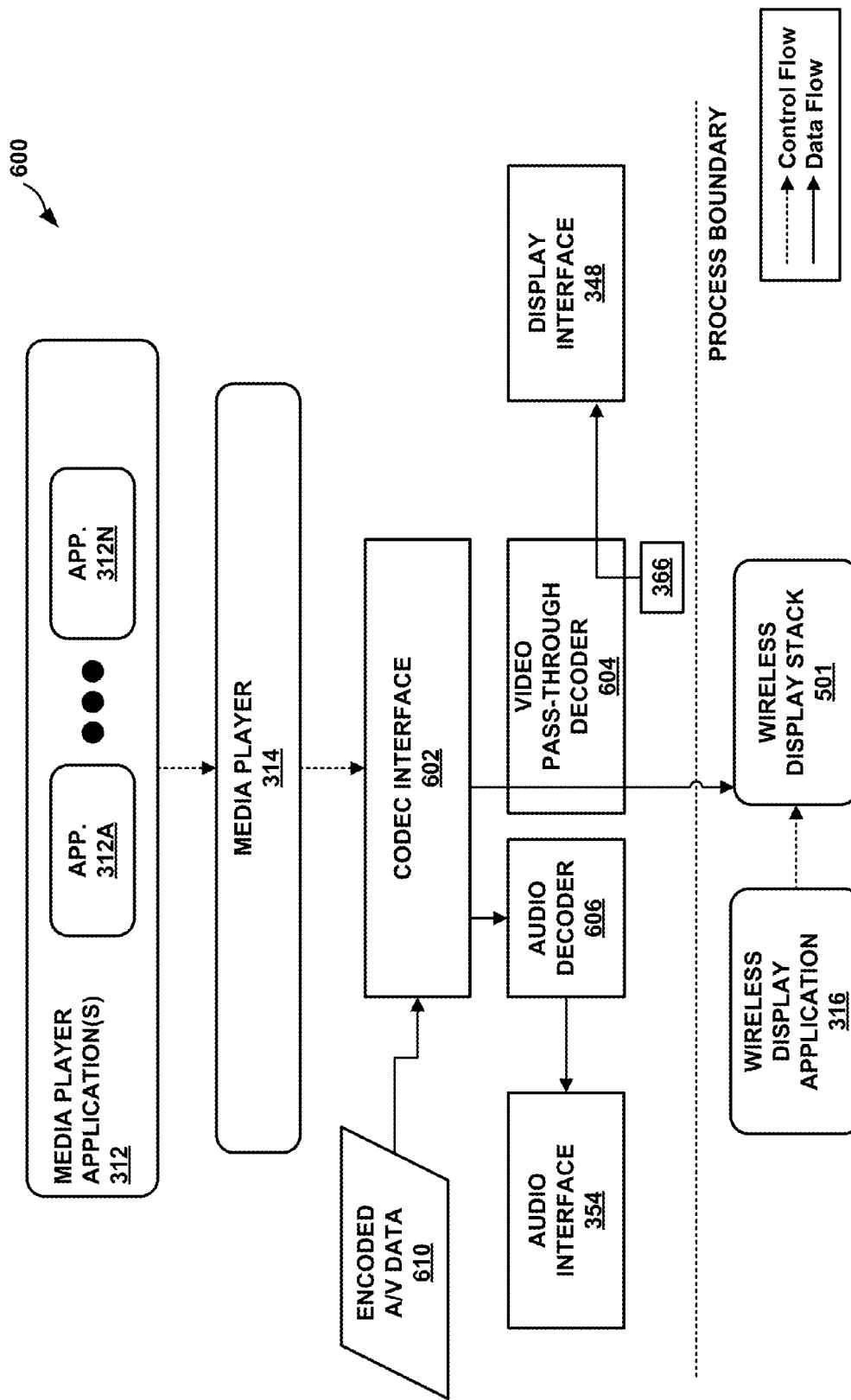
FIG. 6 is a block diagram illustrating example components of a wireless display source device configured to directly stream encoded video data to a wireless display sink computing device according to techniques described in this disclosure.

FIG. 6 is a block diagram illustrating example components of a wireless display source device configured to directly stream encoded video data to a wireless display sink computing device according to techniques described in this disclosure. In this example, wireless display source device 600 may execute one or more media player applications or "player applications" 312A-312N (collectively, "media player applications 312") each using media player 314.

Media player applications 312 may include, for example, applications that receive encoded video data via a network interface from a server or applications that access locally stored media. Media player applications 312 play back encoded video data using media player 314.

Various platforms, of which media player 314 is one example, may have expose Application Programming Interfaces (APIs) with which to perform video playback. However, many such platforms use a standard codec interface 602 to access video decoders and playback will typically eventually use a hardware decoder. Codec interface 602 may represent an OpenMax interface, for instance. Audio decoder 606 is registered as an audio decoder for codec interface 602 and decodes encoded audio data for output via audio interface 354 of the wireless display source device 600.

Wireless display source device 600 also executes wireless display application 316 that executes the wireless display stack 501 to mirror media output of wireless display source device 600 to a wireless display sink device (not shown in FIG. 6) via a wireless communication channel. For a wireless display session, wireless display application 316 may register video pass-through decoder 604 with the codec interface 602 to cause media player 314 to send encoded video frames included in encoded audio/visual (A/V) data 610 to the video pass-through decoder 604. Video pass-through decoder 604 may represent an example of mirror codec 218A. In instances of wireless display source device 600 in which codec interface 602 represents an OpenMax interface, wireless display application 316 may register video pass-through decoder as an OpenMax decoder to provide the common OpenMax interface.

In lieu of decoding the encoded video frames, however, video pass-through decoder 604 passes the encoded video frames to wireless display stack 501 for direct streaming to the wireless display sink device. Direct streaming in this way may reduce video processing power burdens and reduces overall power consumption on source device. Streaming the clip can work on highly fragmented playback frameworks used in different platforms according to techniques described herein.

In addition, for each encoded video frame received, video pass-through decoder 604 sends a "dummy" or predefined frame 366 to media player 314 as a spoof of a video decoded frame corresponding to the encoded video frame received. As a result, media player 314 may operate normally and without modification in some instances.

In some instances of the wireless display source device 600, to maintain audio/video synchronization (AVSYNC), the video pass-through decoder 604 facilitates correct audio and video timestamps. For instance, when the video pass-through decoder 604 receives an encoded video frame, the video pass-through decoder 604 sends a corresponding predefined and non-encoded frame 366 to media player 314 via a buffer. The video pass-through decoder 604 obtains a timestamp for a time at which media player 314 returns the buffer for re-use, and the video pass-through decoder 604 associates this timestamp as the actual play time, or presentation time, for the encoded video frame. This may reduce and in some cases eliminate the need for wireless display source device 600 to perform any additional AVSYNC techniques. In addition, this technique may facilitate seamless seek and other trick mode operations.

Wireless display application 316 may capture audio, according to wireless display streaming operations, from the audio output to audio interface 354 and stream the captured audio to the wireless display sink device using wireless display stack 501. The techniques described above may be incorporated into many different media player implementations in various platforms without disturbing the existing framework for the platforms. Because the techniques may be performed at least in some cases without modification to media player 314, third-party and other media player applications 312 may be used without modification with the techniques. Moreover, using direct stream avoid using video hardware, which may save power and reduce a need for often-expensive video processors. Furthermore, the live nature of the wireless display stream may be maintained by the AVSYNC approach used in the manner described above.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

What is claimed is:

1. A method of transmitting video data from a wireless display source device to a wireless display sink device, the method comprising:
   obtaining encoded video data for a frame of video data;
   receiving, by a video codec, the encoded video data from a media player of the wireless display source device;
   storing, by the video codec, a predefined frame to an output buffer for the media player;
   outputting the predefined frame for the frame of video data;
   receiving, by the video codec, an indication the output buffer has been consumed by the media player;
   storing, by the video codec in response to receiving the indication, a timestamp that represents a presentation time for the predefined frame for the frame of video data; and
   sending the encoded video data for display at a display device associated with the wireless display sink device in association with the timestamp.

2. The method of claim 1, further comprising:
   determining a presentation time for the predefined frame for the frame of video data,
   wherein sending the encoded video data comprises sending the encoded video data in association with the presentation time.

3. The method of claim 1, wherein the predefined frame is selected from the group consisting of a black frame and a user message.

4. The method of claim 1,
   wherein the wireless display source device comprises a Wi-Fi Display source device and the wireless display sink device comprises a Wi-Fi Display sink device, and
   wherein sending the encoded video data comprises sending the encoded video data via a communication session using one or more communications protocols based on the Wi-Fi Display standard.

5. The method of claim 1, wherein sending the encoded video data comprises sending the encoded video data via a communication session that operates according to one of the Wi-Fi Direct and tunneled direct link setup (TDLS) protocols.

6. The method of claim 1, further comprising:
   receiving an indication of a user input;
   in response to receiving the indication of the user input, establishing a mirroring session with the wireless display sink device,
   wherein outputting the predefined frame for the frame of video data comprises outputting the predefined frame for the frame of video data only if the wireless display source device has an active mirroring session with the wireless display sink device.

7. The method of claim 1, wherein the video codec is registered for use by the media player and has an interface usable by the media player for providing encoded video frames to the video codec, the method further comprising:
   loading the video codec for use by the media player in response to receiving an indication of a user input enabling a mirroring session with the wireless display sink device, wherein receiving the encoded video data from the media player comprises receiving, by the video codec, the encoded video data via an input buffer, and wherein storing the predefined frame to an output buffer for the media player comprises storing the predefined frame to the output buffer for the media player in association with any of metadata and timing information needed to cause the media player to display the predefined frame as if the predefined frame is a decoded video frame of the encoded video data.

8. The method of claim 1, further comprising:

determining a presentation time for audio data corresponding to the frame of video data;

sending encoded audio data for the audio data corresponding to the frame of video data in association with the presentation time for the audio data corresponding to the frame of video data; and determining a presentation time for the predefined frame for the frame of video data, wherein sending the encoded video data comprises sending the encoded video data in association with the presentation time for the predefined frame for the frame of video data to synchronize presentation of the audio data corresponding to the frame of video data and the frame of video data at the wireless display sink device.

9. The method of claim 1, wherein the indication the output buffer has been consumed by the media player comprises an indication that audio-video synchronization and rendering were performed by the media player.

10. A source device comprising:

a memory to store video data; and one or more processors, wherein the one or more processors are configured to:

obtain encoded video data for a frame of video data;

output, via a display interface of the source device and for display at a display device, a predefined frame for the frame of video data;

load a video codec for use by a media player in response to receiving an indication of a user input enabling a mirroring session with the wireless display sink device, wherein the video codec is registered for use by the media player and has an interface usable by the media player for providing encoded video frames to the video codec;

receive, by a video codec of the source device via an input buffer, the encoded video data from a media player of the source device;

store, by the video codec, the predefined frame to an output buffer for the media player in association with any of metadata and timing information needed to cause the media player to display the predefined frame as if the predefined frame is a decoded video frame of the encoded video data; and send, to a sink device via a wireless communication channel, the encoded video data for display at a display device associated with the sink device.

11. The source device of claim 10, wherein the one or more processors are further configured to:

determine a presentation time for the predefined frame for the frame of video data, wherein to send the encoded video data the one or more processors are further configured to send, to the sink device, the encoded video data in association with the presentation time.

12. The source device of claim 10, wherein the predefined frame is selected from the group consisting of a black frame and a user message.

13. The source device of claim 10, wherein the source device comprises a Wi-Fi Display source device and the sink device comprises a Wi-Fi Display sink device, and wherein to send the encoded video data the one or more processors are further configured to send, to the sink device, the encoded video data via a communication session using one or more communications protocols based on the Wi-Fi Display standard.

14. The source device of claim 10, wherein to send the encoded video data the one or more processors are further configured to send, to the sink device, the encoded video data via a communication session that operates according to one of the Wi-Fi Direct and tunneled direct link setup (TDLS) protocols.

15. The source device of claim 10, wherein the one or more processors are further configured to:

receive, by the source device, an indication of user input; and in response to receiving the indication of the user input, establish a mirroring session with the sink device, wherein to output the predefined frame for the frame of video data the one or more processors are further configured to output the predefined frame for the frame of video data only if the source device has an active mirroring session with the sink device.

16. The source device of claim 10, wherein the one or more processors are further configured to:

receive, by the video codec, an indication the output buffer has been consumed by the media player; and store, by the video codec in response to receiving the indication, a timestamp that represents a presentation time for the predefined frame for the frame of video data, wherein to send the encoded video data the one or more processors are further configured to send, to the sink device, the encoded video data in association with the timestamp.

17. The source device of claim 10, wherein the one or more processors are further configured to:

determine a presentation time for audio data corresponding to the frame of video data;

send, to the sink device, encoded audio data for the audio data corresponding to the frame of video data in association with the presentation time for the audio data corresponding to the frame of video data; and determine a presentation time for the predefined frame for the frame of video data, wherein to send the encoded video data the one or more processors are further configured to send, to the sink device, the encoded video data in association with the presentation time for the predefined frame for the frame of video data to synchronize presentation of the audio data corresponding to the frame of video data and the frame of video data at the sink device.

18. A source device comprising:

means for obtaining encoded video data for a frame of video data;

means for outputting a predefined frame for the frame of video data;

means for loading the video codec for use by the media player in response to receiving an indication of a user input enabling a mirroring session with the wireless display sink device;

means for receiving by a video codec registered for use by the media player comprising an interface usable by the media player for providing encoded video frames to the video codec via an input buffer, the encoded video data from a media player of the wireless display source device;

means for storing, by the video codec, the predefined frame to an output buffer for the media player in association with any of metadata and timing information needed to cause the media player to display the predefined frame as if the predefined frame is a decoded video frame of the encoded video data; and means for sending, to a sink device via a wireless communication channel, the encoded video data for display at a display device associated with the sink device.

19. The source device of claim 18, further comprising:
means for determining a presentation time for the predefined frame for the frame of video data,
wherein the means for sending the encoded video data comprises means for sending, to the sink device, the encoded video data in association with the presentation time.

20. The source device of claim 18, wherein the predefined frame is selected from the group consisting of a black frame and a user message.

21. The source device of claim 18,
wherein the source device comprises a Wi-Fi Display source device and the sink device comprises a Wi-Fi Display sink device, and
wherein the means for sending the encoded video data comprises means for sending, to the sink device, the encoded video data via a communication session using one or more communications protocols based on the Wi-Fi Display standard.

22. The source device of claim 18, wherein the means for sending the encoded video data comprises means for sending, to the sink device, the encoded video data via a communication session that operates according to one of the Wi-Fi Direct and tunneled direct link setup (TDLS) protocols.

23. The source device of claim 18, further comprising:
means for receiving an indication of a user input; and
means for, in response to receiving the indication of the user input, establishing a mirroring session with the sink device,
wherein the means for outputting the predefined frame for the frame of video data comprises means for outputting the predefined frame for the frame of video data only if the source device has an active mirroring session with the sink device.

24. The source device of claim 18, further comprising:
means for receiving, by the video codec of the source device, an indication the output buffer has been consumed by the media player; and
means for storing, by the video codec in response to receiving the indication, a timestamp that represents a presentation time for the frame of video data,
wherein the means for sending the encoded video data comprises means for sending, to the sink device, the encoded video data in association with the timestamp.

25. A non-transitory computer-readable storage medium comprising instructions stored thereon that, when executed, configure one or more processors of a wireless display source device to:
obtain encoded video data for a frame of video data;
receive, by a video codec, the encoded video data from a media player of the wireless display source device;
store, by the video codec, a predefined frame to an output buffer for the media player;
output a predefined frame for the frame of video data;
receiving, by the video codec, an indication the output buffer has been consumed by the media player;
storing, by the video codec in response to receiving the indication, a timestamp that represents a presentation time for the predefined frame for the frame of video data; and
send the encoded video data for display at a display device associated with a wireless display sink device in association with the timestamp.

26. The non-transitory computer-readable storage medium of claim 25, wherein the indication the output buffer has been consumed by the media player comprises an indication that audio-video synchronization and rendering were performed by the media player.

* * * * *